United States Patent
Huang et al.

(10) Patent No.: US 11,706,799 B2
(45) Date of Patent: *Jul. 18, 2023

(54) CHANNEL ACCESS METHOD AND APPARATUS

(71) Applicant: Huawei Technologies Co., Ltd., Shenzhen (CN)

(72) Inventors: Lei Huang, Shanghai (CN); Yingpei Lin, Munich (DE); Jiayin Zhang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/336,477

(22) Filed: Jun. 2, 2021

(65) Prior Publication Data

US 2021/0360690 A1     Nov. 18, 2021

Related U.S. Application Data

(63) Continuation of application No. 16/565,437, filed on Sep. 9, 2019, now Pat. No. 11,044,751, which is a (Continued)

(30) Foreign Application Priority Data

Mar. 9, 2017    (CN) .......................... 201710139075.1

(51) Int. Cl.
*H04W 74/08*      (2009.01)
*H04W 72/04*      (2023.01)
(Continued)

(52) U.S. Cl.
CPC ....... *H04W 74/08* (2013.01); *H04W 72/0446* (2013.01); *H04W 16/14* (2013.01)

(58) Field of Classification Search
CPC ............. H04W 74/0808; H04W 74/08; H04W 72/0466; H04W 16/14
See application file for complete search history.

(56) References Cited

U.S. PATENT DOCUMENTS

2014/0169290 A1    6/2014   Seok
2015/0016293 A1    1/2015   Zhang
(Continued)

FOREIGN PATENT DOCUMENTS

CN     104335662 A     2/2015
CN     104871630 A     8/2015
(Continued)

OTHER PUBLICATIONS

CATT, "UL channel access for Rel-14 eLAA", 3GPPTSG RAN WG1 Meeting #85, R1-164200, May 23-27, 2016, 3 pages.
(Continued)

*Primary Examiner* — Brian D Nguyen
(74) *Attorney, Agent, or Firm* — Slater Matsil, LLP

(57) ABSTRACT

A channel access method is provided. Under the method, a network element performs random backoff listen before talk (LBT) for channel preemption, and after the preemption succeeds, performs signal transmission in the first transmission time interval TTI within a maximum channel occupancy time MCOT. The network element also performs nonrandom backoff LBT for channel preemption before another at least one TTI within the maximum channel occupancy time MCOT.

20 Claims, 8 Drawing Sheets

Related U.S. Application Data continuation of application No. PCT/CN2018/077005, filed on Feb. 23, 2018.

(51) Int. Cl.
*H04W 72/0446* (2023.01)
*H04W 16/14* (2009.01)

(56) References Cited

U.S. PATENT DOCUMENTS

| | | |
|---|---|---|
| 2015/0057008 A1 | 2/2015 | Seok |
| 2016/0037560 A1 | 2/2016 | Liu et al. |
| 2016/0127098 A1 | 5/2016 | Ng et al. |
| 2017/0019909 A1 | 1/2017 | Si et al. |
| 2017/0196020 A1 | 7/2017 | Mukherjee et al. |
| 2017/0230972 A1 | 8/2017 | Wang et al. |
| 2018/0270860 A1* | 9/2018 | Bhorkar ............ H04W 74/0808 |
| 2018/0323917 A1* | 11/2018 | Um ................ H04L 5/0048 |
| 2018/0324604 A1 | 11/2018 | Yang et al. |
| 2019/0014596 A1 | 1/2019 | Yang et al. |
| 2019/0246412 A1* | 8/2019 | Noh ................ H04L 5/14 |
| 2019/0342915 A1* | 11/2019 | Kim ................ H04W 72/0406 |
| 2021/0144763 A1* | 5/2021 | Park ................ H04L 1/1664 |
| 2021/0195639 A1* | 6/2021 | Kim ................ H04W 74/085 |

FOREIGN PATENT DOCUMENTS

| | | |
|---|---|---|
| CN | 106332283 A | 1/2017 |
| CN | 107889113 A | 4/2018 |
| EP | 3503653 A1 | 6/2019 |
| KR | 20160121391 A | 10/2016 |
| WO | 2018062966 A1 | 4/2018 |

OTHER PUBLICATIONS

LG Electronics, "LBT schemes in LAA UL", 3GPP TSG RAN WG1 meeting#84, R1-160630, Feb. 15-19, 2016, 10 pages.

Nokia et al., "Channel Access for LAA UL", 3GPP TSG RAN WG1 Meeting #84bis, R1-162920, Apr. 11-15, 2016, 9 pages.

Park, S.J. et al., "Multi-Channel Operation in 11ay", IEEE 802.11-16/0401, Mar. 14, 2016, 9 pages.

ZTE, "Operation on high frequency band of unlicensed spectrum in NR", 3GPP TSG RAN WG1 Meeting #87, R1-1612169, Nov. 14-18, 2016, 4 pages.

ZTE, "Discussion on the UL LBT for LAA", 3GPP TSG RAN WG1 Meeting#85, R1-164603, May 23-27, 2016, 9 pages.

\* cited by examiner

CHANNEL ACCESS METHOD AND APPARATUS

CROSS-REFERENCE TO RELATED APPLICATIONS

This application is a continuation of U.S. patent application Ser. No. 16/565,437, filed on Sep. 9, 2019, now U.S. Pat. No. 11,044,751, which is a continuation of International Application No. PCT/CN2018/077005, filed on Feb. 23, 2018, which claims priority to Chinese Patent Application No. 201710139075.1, filed on Mar. 9, 2017. All of the aforementioned patent applications are hereby incorporated by reference in their entireties.

TECHNICAL FIELD

This application relates to the field of communications technologies, and in particular, to a channel access method and apparatus.

BACKGROUND

Currently, as requirements for a data transmission rate, communication quality, and the like of mobile communication grow increasingly, existing frequency bands used for mobile communication become quite crowded. However, at high frequency bands above 6 GHz, a large quantity of spectrum resources are still not allocated for use. Introducing the high frequency bands above 6 GHz into cellular access communication to fully utilize high bandwidth resources of the high frequency bands is one of important research directions of a 5G (5th-Generation) mobile communications technology and next-generation Wi-Fi.

The high frequency bands have very abundant bandwidth resources. Some bandwidth resources belong to a licensed frequency band that can only be used after being paid for and licensed. Some bandwidth resources belong to an unlicensed frequency band that can be used without being licensed, for example, a 60 GHz frequency band. To better use the unlicensed frequency band, each country or region promulgates corresponding regulations to ensure fair and standard use of the frequency band, for example, a listen before talk (LBT for short) mechanism. The LBT mechanism requires that a device that uses a corresponding frequency band needs to listen on the frequency band first, for example, detecting received energy to check whether the frequency band is occupied. If the frequency band is not busy, that is, not occupied, the device can occupy the frequency band and start data transmission. The device can only occupy the frequency band for specific duration. After the frequency band is released, the device performs LBT again for channel preemption. The LBT mechanism can ensure fair access to a transmission medium and is a very effective method for sharing an unlicensed frequency band. The LBT mechanism needs to meet a corresponding regulatory requirement. For example, European regulations stipulate that LBT must be performed.

Based on experience of using a low unlicensed frequency band, if a high unlicensed frequency band is used for communication, the LBT mechanism needs to be supported for channel access. How to design a high-frequency-system LBT mechanism that is compatible with a low frequency system LBT mechanism is a problem to be urgently resolved.

SUMMARY

This application provides a channel access method and apparatus, to ensure coexistence and performance of systems when an LBT requirement of a high unlicensed frequency band is met.

According to a first aspect, a channel access method is provided, including: performing, by a network element, random backoff LBT for channel preemption, and after the preemption succeeds, performing signal transmission in the first TTI (transmission time interval) within an MCOT (maximum channel occupancy time); and performing, by the network element before another at least one TTI within the maximum channel occupancy time MCOT, nonrandom backoff LBT for channel preemption.

Corresponding to the method according to the foregoing aspect, a channel access apparatus is further provided. The apparatus corresponds to the network element in the foregoing method, and includes a processor, configured to perform random backoff LBT for channel preemption; and a transceiver, configured to perform, after the channel preemption succeeds, signal transmission in the first TTI within a maximum channel occupancy time MCOT. The processor is further configured to perform, before another at least one TTI within the maximum channel occupancy time MCOT, nonrandom backoff LBT for channel preemption.

In another apparatus, the processor may be replaced by a processing module, and the transceiver may be replaced by a transceiver module.

The network element may perform, before each TTI other than the first TTI within the maximum channel occupancy time MCOT, the nonrandom backoff LBT for channel preemption, or may perform, before some TTIs, the nonrandom backoff LBT for channel preemption.

With reference to the foregoing aspects, the random backoff LBT is omnidirectional random backoff LBT or directional random backoff LBT, and signal transmission in the first TTI is directional signal transmission.

The directional signal transmission is to send a signal by using a transmit beam or receive a signal by using a receive beam. A direction of the directional random backoff LBT is the same as a beam direction of signal transmission performed in a TTI after the directional random backoff LBT. To be specific, if the random backoff LBT is successfully performed in a direction, a corresponding transmit beam is used to send a signal or a corresponding receive beam is used to receive a signal in the direction thereafter.

The nonrandom backoff LBT is directional nonrandom backoff LBT, and signal transmission in a TTI after the directional nonrandom backoff LBT is directional signal transmission.

The directional signal transmission is to send a signal by using a transmit beam or receive a signal by using a receive beam. A direction of the directional nonrandom backoff LBT is the same as a beam direction of signal transmission in the TTI after the directional nonrandom backoff LBT. To be specific, if the nonrandom backoff LBT is successfully performed in a direction, a corresponding transmit beam is used to send a signal or a corresponding receive beam is used to receive a signal in the direction thereafter.

With reference to the foregoing aspects, the performing, by a network element, random backoff LBT for channel preemption includes: detecting, by the network element, whether a channel is idle, and if it is detected that the channel is idle, preempting the channel, otherwise, continuing to perform channel detection after performing random backoff, until the channel is preempted.

With reference to the foregoing aspects, the performing, by the network element, nonrandom backoff LBT for channel preemption includes: detecting, by the network element, whether a channel is idle, and if it is detected that the channel is idle, preempting the channel and performing signal transmission in a corresponding TTI, otherwise, keeping silent in the TTI, and further, continuing to perform the nonrandom backoff LBT in a next TTI.

With reference to the foregoing aspects, the network element is a terminal device or a network device, for example, a base station or a user terminal, or an AP (access point) or a STA (station).

The foregoing solution can be used in both a high frequency communications system and a low frequency communications system, ensures coexistence and performance of systems when an LBT requirement of a high unlicensed frequency band is met, and further ensures directional signal transmission of the high frequency system, thereby improving system operating efficiency, and increasing a system capacity.

According to another aspect, a channel access method is disclosed, including: performing, by a first network element, random backoff LBT for channel preemption, and after the preemption succeeds, notifying, by the first network element in at least one TTI within a maximum channel occupancy time MCOT, a second network element of frame structure information of a corresponding TTI, so that the second network element performs directional signal transmission in the corresponding TTI.

Corresponding to the method according to the foregoing another aspect, a channel access apparatus is further provided. The apparatus corresponds to the first network element in the foregoing method, and includes a processor, configured to perform random backoff LBT for channel preemption; and a transceiver, configured to notify, in at least one TTI within a maximum channel occupancy time MCOT after the preemption succeeds, a network element of frame structure information of a corresponding TTI, so that the network element performs directional signal transmission in the corresponding TTI. The network element corresponds to the second network element in the foregoing method.

With reference to the foregoing aspect, the processor is further configured to perform, before another at least one TTI within the MCOT, nonrandom backoff LBT for channel preemption.

In another example, the processor may be replaced by a processing module, and the transceiver may be replaced by a transceiver module.

With reference to the foregoing aspects, the corresponding TTI is one TTI or a plurality of consecutive TTIs. For example, if the first TTI and the second TTI are consecutive TTIs, the first network element notifies, in the first TTI within the maximum channel occupancy time MCOT, the second network element of frame structure information of the first TTI and frame structure information of the second TTI. Alternatively, if the second TTI and the third TTI are consecutive TTIs, the first network element notifies, in the second TTI within the MCOT, the second network element of frame structure information of the second TTI and frame structure information of the third TTI.

With reference to the foregoing aspects, the frame structure information of the corresponding TTI includes: Whether the corresponding TTI includes an LBT gap. For example, whether each TTI includes an LBT gap. If there are a plurality of TTIs, the notification may be performed in the first TTI, or may be separately performed in each TTI.

If there is one corresponding TTI, the first network element notifies the second network element whether the TTI includes an LBT gap. When there are a plurality of corresponding TTIs, the frame structure information of the corresponding TTI includes: that the last TTI includes an LBT gap, but other TTIs do not include an LBT gap; or that only the last TTI includes an LBT gap; or a length or a quantity of the plurality of consecutive TTIs. For example, if the first TTI and the second TTI are consecutive TTIs, the first network element notifies the second network element that only the second TTI includes an LBT gap, or notifies the second network element that the first TTI does not include an LBT gap, but the second TTI includes an LBT gap, or notifies the second network element of a length or a quantity of the two consecutive TTIs.

With reference to the foregoing aspect, the method further includes: performing, by the first network element, signal transmission with the second network element in the corresponding TTI, and if the corresponding TTI is a plurality of consecutive TTIs, performing, by the first network element, signal transmission in the plurality consecutive TTIs.

There may be one or more second network elements. The signal transmission may be to send a signal or receive a signal. For example, the first network element may send a signal to the second network element by using a transmit beam, or the first network element may receive a signal from the second network element by using a receive beam.

With reference to the foregoing aspect, the method further includes: performing, by the first network element before performing signal transmission in another at least one TTI within the MCOT, nonrandom backoff LBT for channel preemption. The nonrandom backoff LBT may be performed before consecutive TTIs, or may be performed after consecutive TTIs. For example, if the first TTI and the second TTI within the MCOT are consecutive TTIs, after transmission is completed, the nonrandom backoff LBT may be performed before the third TTI, to perform signal transmission in the third TTI. Alternatively, if the third TTI and the fourth TTI within the MCOT are consecutive TTIs, the nonrandom backoff LBT may be performed before the second TTI, to perform signal transmission in the second TTI. Further, after transmission is completed in the second TTI, the nonrandom backoff LBT may be performed for channel preemption. After the channel preemption succeeds, the first network element notifies the second network element that only the fourth TTI includes an LBT gap in the third TTI, so that the second network element performs directional signal transmission in the third TTI and the fourth Tn.

An operation of performing the nonrandom backoff LBT and a definition of the signal transmission are similar to those in the method of the foregoing aspect, and details are not described herein again.

The first network element is a network device, and the second network element is a terminal device; or the first network element is a terminal device, and the second network element is a network device. For example, the first network element is an AP, and the second network element is a STA; or the first network element is a STA, and the second network element is an AP; or the first network element is a base station, and the second network element is a user terminal; or the first network element is a user terminal, and the second network element is a base station.

With reference to the foregoing aspects, the signal includes at least one of the following: signaling and data.

The foregoing solution implements a directional LBT function at a high unlicensed frequency band, thereby ensuring directional signal transmission of a system, improving system operating efficiency, or increasing a system capacity.

Still another aspect of this application provides a computer program product including an instruction. When the instruction runs on a computer, the computer performs the methods according to the foregoing aspects.

Yet another aspect of this application provides a computer readable storage medium. The computer readable storage medium stores an instruction. When the instruction runs on a computer, the computer performs the methods according to the foregoing aspects.

BRIEF DESCRIPTION OF THE DRAWINGS

To describe the technical solutions in the embodiments of this application more clearly, the following briefly describes the accompanying drawings required for describing the embodiments or the prior art. Apparently, the accompanying drawings in the following description merely show some embodiments of this application, and a person of ordinary skill in the art may derive other drawings from these accompanying drawings without creative efforts.

DETAILED DESCRIPTION OF ILLUSTRATIVE EMBODIMENTS

Figure 1:
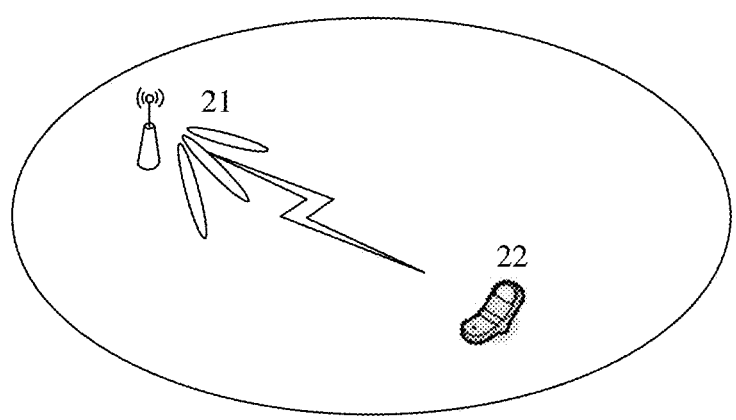
FIG. 1 is a schematic diagram of a network architecture of an application scenario according to an embodiment of this application.

FIG. 1 is a schematic diagram of an application scenario according to one embodiment. A networking architecture shown in FIG. 1 mainly includes a network device 21 and a terminal device 22. The network device 21 communicates with the terminal device 22 by using a millimeter-wave band with relatively high frequency. A millimeter-wave band is usually a frequency band above 6 GHz such as 28 GHz or 38 GHz, or an enhanced bandwidth frequency band (E-band), with a relatively small coverage area, used in a data plane. The terminal device 22 covered by the network device 21 may communicate with the network device 21 by using a millimeter-wave band with relatively high frequency. The network is a 5G mobile communications network, or may be a next-generation Wi-Fi network, for example, an IEEE802.11ay protocol network.

The terminal device 22 in this embodiment may be an access terminal, a subscriber unit, a subscriber station, a mobile station, a mobile, a remote station, a remote terminal, a mobile device, a user terminal, a terminal, a wireless communications device, a user agent, or a user apparatus. The access terminal may be a cellular phone, a cordless phone, a session initiation protocol ("SIP" for short) phone, a wireless local loop ("WLL" for short) station, a personal digital assistant ("PDA" for short), a handheld device having a wireless communication function, a computing device, another processing device connected to a wireless modem, an in-vehicle device, a wearable device, and a terminal in a 5G network, a STA in next-generation Wi-Fi, or the like.

The network device 21 in this embodiment may be a network side device working at a frequency band above 6 GHz (including 6 GHz), for example, a wireless fidelity (Wireless-Fidelity, Wi-Fi) access point AP, or a base station in next-generation communication such as a gNB, a small cell, a micro base station, or a TRP (transmission reception point) in 5G, or may be a relay station, an access point, an in-vehicle device, or a wearable device working at a high frequency band.

An example in which a network element performs LBT is used for description in the following embodiments. The network element may be a network device, for example, a base station, a TRP, or an access point AP, or may be a terminal device, for example, a user terminal or a STA.

In an LAA (Licensed Assisted Access) standard defined by 3GPP, a corresponding LBT mechanism is defined for a low unlicensed frequency band. At the low unlicensed frequency band, both a network device and a user terminal receive and send data by using an omnidirectional antenna. Therefore, an LBT mechanism of the network device and the user terminal is also implemented based on the omnidirectional antenna. After successfully preempting a channel in an LBT operation, the network device does not need to perform the LBT operation any longer within a period of time, for example, an MCOT (Maximum channel occupancy time, maximum channel occupancy time). It may be considered that the network device occupies the channel within the MCOT all the time, and performs corresponding data transmission based on a frame structure defined for a licensed frequency band.

For a high unlicensed frequency band above 6 GHz, for example, a 60 GHz frequency band, because the frequency band has a large path loss, a transmission mechanism in which a narrow beam is formed by using large-scale array antennas needs to be introduced to perform corresponding data transmission. There is a specific difference between interference caused by directional narrow-beam transmission in a system and interference caused by omnidirectional narrow-beam transmission in the system. If an omnidirectional LBT mechanism for the low unlicensed frequency band is used directly, specific impact is definitely imposed on system performance.

There are two common LBT mechanisms. One is non-random backoff LBT, that is, LBT in which random backoff is not performed; a network element performs an LBT operation only once, but performs no more operations if the network element fails to access a channel; and the nonrandom backoff LBT is usually referred to as Cat-2 LBT. The other is random backoff LBT, that is, LBT in which random backoff is performed with a variable window length; if a network element fails to access a channel after performing an LBT operation once, the network element continues to perform the LBT operation after backing off a random window length, until the network element successfully accesses the channel; and the random backoff LBT is usually referred to as Cat-4 LBT. For example, in LAA, a base station usually performs the Cat-4 LBT before downlink data transmission, and the base station usually performs the Cat-2 LBT before DRS (Discovery Reference Signal) transmission.

Embodiment 1

A network element performs random backoff LBT for channel preemption, and after the preemption succeeds, performs signal transmission in the first TTI within a maximum channel occupancy time MCOT. Before another at least one TTI within the maximum channel occupancy time MCOT, the network element performs nonrandom backoff LBT for channel preemption.

Figure 2A:
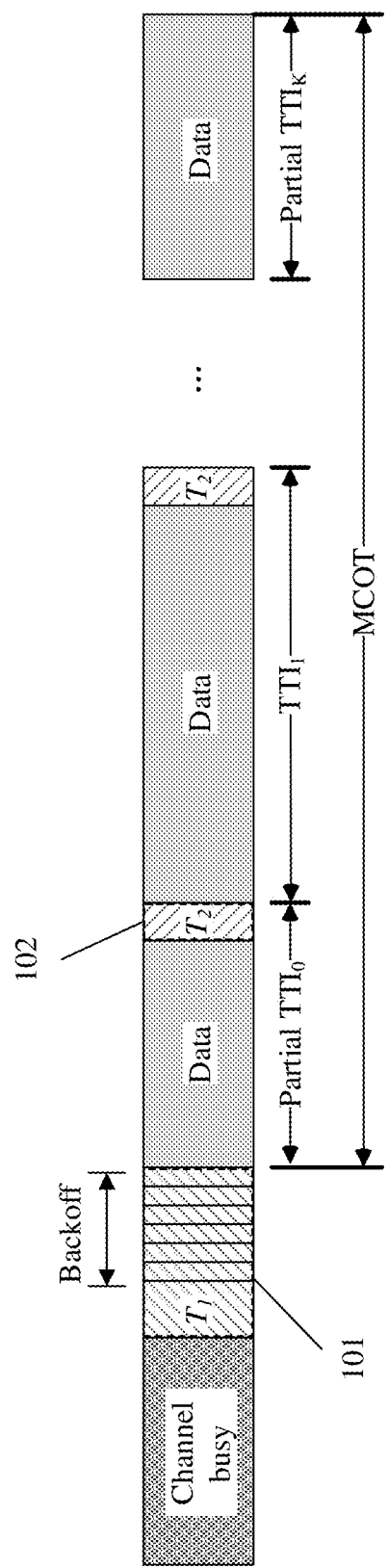
FIG. 2a and FIG. 2b are schematic diagrams of frame structures of a channel access method according to an embodiment of this application.
Figure 2B:
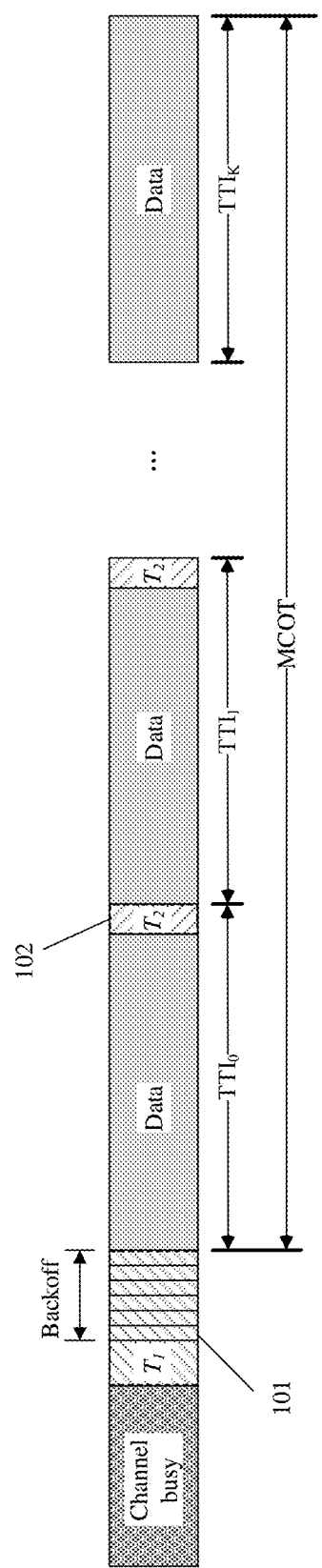

Referring to FIG. 2a and FIG. 2b, the method includes the following steps.

101. The network element performs Cat-4 LBT for channel preemption, and after the preemption succeeds, performs signal transmission in the first TTI within the MCOT.

The network element may be a network device, or may be a terminal device. If signal transmission needs to be performed, the network element performs the Cat-4 LBT first. As shown in FIG. 2a and FIG. 2b, the network element performs the Cat-4 LBT within a time $T_1$. That is, if the network element fails to access a channel after performing an LBT operation once, the network element backs off a random window length to continue to perform the LBT operation. After the channel preemption succeeds, the network element immediately performs signal transmission in the first TTI. The first TTI may be a complete TTI (for example, a $TTI_0$ shown in FIG. 2b), or may be a partial TTI (for example, a partial $TTI_0$ shown in FIG. 2a). This is because when the Cat-4 LBT is performed for channel preemption, random backoff may be performed after first preemption fails.

A length of the MCOT may be predefined, and a length of the TTI may also be predefined. One MCOT usually includes a plurality of TTIs. The signal transmission may be that a network device sends a signal to a terminal device, or may be that a network device receives a signal sent by a terminal device, or may be that a terminal device sends a signal to a network device, or may be that a terminal device receives a signal sent by a network device. The signal may be at least one of data or signaling.

That a network element performs Cat-4 LBT for channel preemption is an existing technology. Channel quality detection is used as an example. If channel quality is less than a preset threshold, it is considered that a channel is idle, and channel preemption is performed. Otherwise, random backoff is performed to continue detection, until the preemption succeeds.

102. The network element performs Cat-2 LBT before another at least one TTI within the MCOT.

After completing transmission in the first TTI, the network element needs to perform the Cat-2 LBT before other TTIs within the MCOT. The network element may perform the Cat-2 LBT before each remaining TTI, or before some remaining TTIs, that is, perform channel state detection. If it is detected that a channel is idle, the network element performs signal transmission in a subsequent TTI, and if it is detected that the channel is busy, the network element keeps silent in the TTI. The network element performs the Cat-2 LBT again in a next TTI until the Cat-2 LBT detects that the channel is idle, so that the network element can send a signal in a corresponding TTI.

For example, as shown in FIG. 2a and FIG. 2b, after signal transmission in the $TTI_0$ is completed, if signal transmission needs to be performed in a $TTI_1$, the Cat-2 LBT needs to be performed in $T_2$ before the $TTI_1$, where the last period of time of the $TTI_0$ is occupied by $T_2$. Therefore, the previous $TTI_0$ includes an LBT gap used by the network element to perform the Cat-2 LBT.

The signal transmission in the $TTI_1$ is used above as an example for description. A similar manner may be used in a subsequent $TTI_2$ to a $TTI_k$.

The signal transmission may be that a network device sends a signal to a terminal device, or may be that a network device receives a signal sent by a terminal device, or may be that a terminal device sends a signal to a network device, or may be that a terminal device receives a signal sent by a network device.

After one MCOT ends, the network element needs to re-perform the Cat-4 LBT for channel preemption.

Figure 2C:
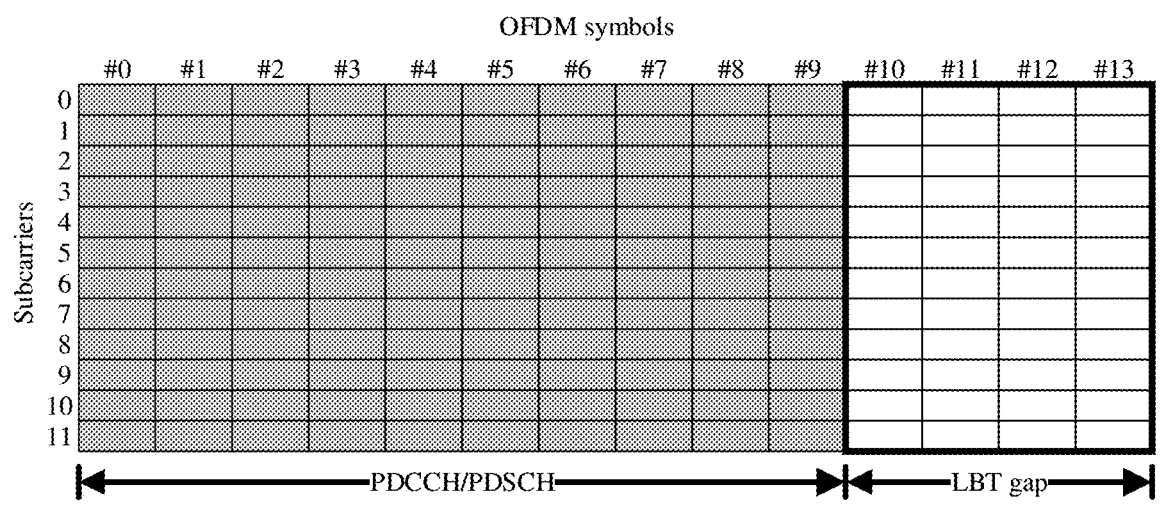
FIG. 2c is a schematic diagram of a TTI frame structure of a channel access method according to an embodiment of this application.

According to the foregoing LBT method, a frame structure shown in FIG. 2C is further disclosed. The frame includes two time-division parts, and each part may include a plurality of OFDM (orthogonal frequency division multiplexing) symbols. The first part is used to transmit a signal, for example, transmitting a PDCCH (physical downlink control channel)/PDSCH (physical downlink shared channel), and the second part is an LBT gap used by a network element to perform Cat-2 LBT. For example, both the $TTI_0$ and the $TTI_1$ in FIG. 2a and FIG. 2b are of the foregoing frame structure.

The frame structure is divided into two continuous parts in time domain. The first part is a signal transmission part, and the second part is an LBT gap part. The LBT gap part is reserved for a network element to perform Cat-2 LBT. Each part includes a plurality of symbols, for example, OFDM symbols. A specific quantity of symbols of the reserved LBT gap in the frame structure is determined by required Cat-2 LBT duration defined by a system and a length of a system OFDM. Duration of the reserved LBT gap is greater than or equal to the required Cat-2 LBT duration. As shown in FIG. 2C, it is assumed that one TTI includes 14 OFDM symbols, a length of each OFDM symbol is approximately 2 μs, and the required Cat-2 LBT duration is 8 μs. Therefore, last four OFDM symbols are reserved for a base station to perform Cat-2 LBT, and first 10 OFDM symbols are used to transmit data and signaling on a PDCCH/PDSCH or the like.

This embodiment provides an LBT mechanism and a frame structure design that supports the mechanism, to ensure coexistence and performance of systems when an LBT requirement of a high unlicensed frequency band is met.

Embodiment 2

A network element performs omnidirectional or directional random backoff LBT for channel preemption, and after the preemption succeeds, performs directional signal transmission in the first TTI within a maximum channel occupancy time MCOT. Before another at least one TTI within the maximum channel occupancy time MCOT, the network element performs directional nonrandom backoff LBT for channel preemption. Random backoff LBT may be omnidirectional random backoff LBT, or may be directional random backoff LBT. Nonrandom backoff LBT is directional nonrandom backoff LBT, and signal transmission in each TTI is directional signal transmission.

Figure 3A:
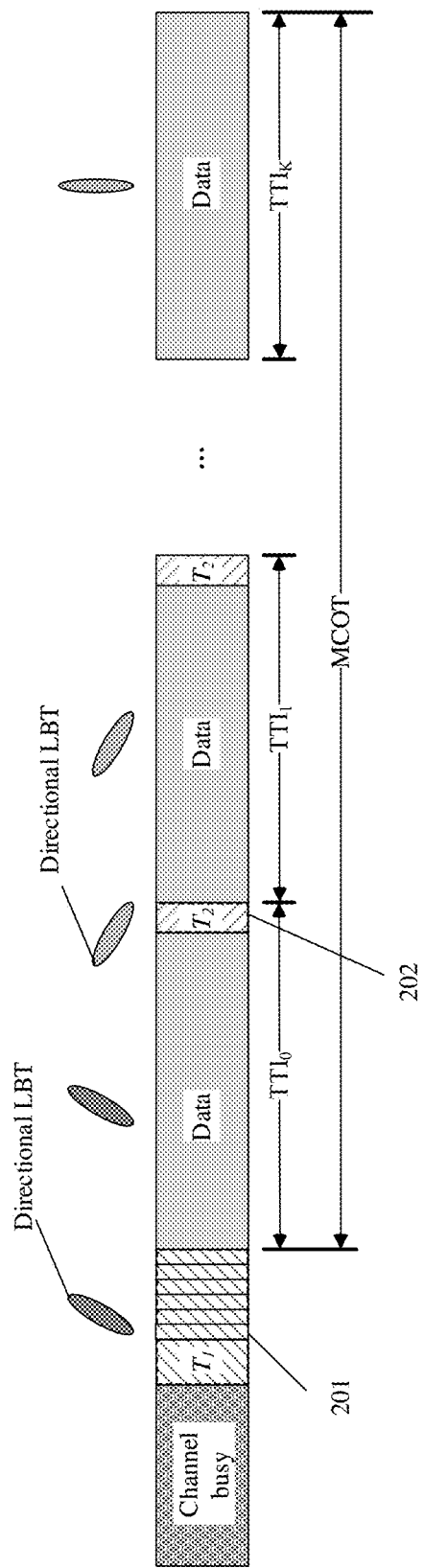
FIG. 3a and FIG. 3b are schematic diagrams of frame structures of a channel access method according to another embodiment of this application.
Figure 3B:
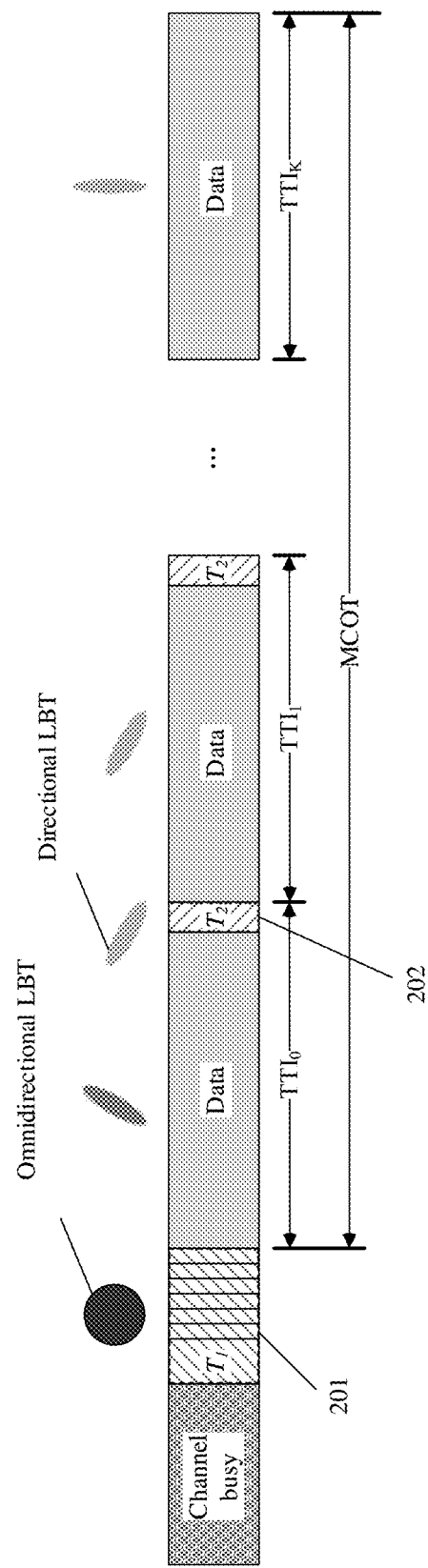

Referring to FIG. 3a and FIG. 3b, the method includes the following steps.

201. The network element performs omnidirectional or directional Cat-4 LBT for channel preemption, and after the preemption succeeds, performs directional signal transmission in the first TTI within the MCOT.

The network element may be a network device, or may be a terminal device. If signal transmission needs to be performed, the network element performs the Cat-4 LBT first. The Cat-4 LBT may be omnidirectional LBT (as shown in FIG. 3b), or may be directional LBT (as shown in FIG. 3a). That is, if the network element fails to access a channel after performing an omnidirectional or directional LBT operation once, the network element backs off a random window length to continue to perform the LBT operation. After the channel preemption succeeds, the network element immediately performs directional signal transmission in the first TTI. The first TTI may be a complete TTI (for example, a $TTI_0$ shown in FIG. 3a or FIG. 3b), or may be, similar to Embodiment 1, a partial TTI. This is because when the Cat-4 LBT is performed for channel preemption, random backoff may be performed after first preemption fails.

A length of the MCOT may be predefined, and a length of the TTI may also be predefined. One MCOT usually includes a plurality of TTIs.

That a network element performs omnidirectional Cat-4 LBT for channel preemption is an existing technology. Omnidirectional channel quality detection is used as an example. If channel quality is less than a preset threshold, it is considered that a channel is idle, and channel preemption is performed. Otherwise, random backoff is performed to continue detection, until the preemption succeeds.

That a network element performs omnidirectional Cat-4 LBT for channel preemption is an existing technology. Channel quality detection in a direction is used as an example. If channel quality in the direction is less than a preset threshold, it is considered that a channel is idle in the direction, and channel preemption is performed, and then signal transmission may be performed in the direction. Otherwise, random backoff is performed to continue detection, until the preemption succeeds.

A channel can be preempted finally in either the omnidirectional Cat-4 LBT or the directional Cat-4 LBT, and then directional signal transmission is performed in a corresponding direction. The signal transmission may be to send a signal or receive a signal. For example, a network device sends a signal to a terminal device by using a transmit beam, or a network device receives a signal from a terminal device by using a receive beam, or a terminal device sends a signal to a network device by using a transmit beam, or a terminal device receives a signal from a network device by using a receive beam. The signal may be at least one of data or signaling.

For example, in FIG. 3b, after the omnidirectional Cat-4 LBT for channel preemption is successfully performed in $T_1$, a beam in a direction is used to perform directional signal transmission in the $TTI_0$. In FIG. 3a, after the directional Cat-4 LBT for channel preemption is successfully performed in $T_1$ in a direction, a beam in the direction is used to perform signal transmission in the $TTI_0$, that is, a direction of the directional Cat-4 LBT is the same as a beam direction of signal transmission in a subsequent TTI.

202. The network element performs directional Cat-2 LBT before another TTI within the MCOT.

One MCOT usually includes a plurality of TTIs. After completing transmission in the first TTI, but before performing directional signal transmission in another TTI within the MCOT, the network element needs to perform the directional Cat-2 LBT, that is, perform directional channel state detection. If it is detected that a channel is idle, the network element performs directional signal transmission in a corresponding TTI, and if it is detected that the channel is busy, the network element keeps silent in the TTI. The network element performs the directional Cat-2 LBT again in a next TTI until the Cat-2 LBT detects that the channel is idle, so that the network element can perform directional signal transmission in a corresponding TTI.

A length of the MCOT may be predefined, and usually includes a plurality of TTIs. The transmission may be to send a signal or receive a signal. For example, a network device sends a signal to a terminal device by using a transmit beam, or a network device receives a signal from a terminal device by using a receive beam, or a terminal device sends a signal to a network device by using a transmit beam, or a terminal device receives a signal from a network device by using a receive beam. The signal may be at least one of data or signaling.

After one MCOT ends, the network element needs to re-perform the Cat-4 LBT for channel preemption.

After signal transmission in the $TTI_0$ in FIG. 3a and FIG. 3b ends, but before directional signal transmission in a $TTI_1$ is performed, the directional Cat-2 LBT is performed first in $T_2$, where the last period of time of the $TTI_0$ is occupied by $T_2$. Therefore, the previous $TTI_0$ includes an LBT gap used by the network element to perform the Cat-2 LBT. If it is detected that a channel in a direction is idle, directional signal transmission is performed in the direction, that is, a direction of the directional Cat-2 LBT is the same as a beam direction of signal transmission in a subsequent TTI. Otherwise, silence is kept in the TTI, and the directional Cat-2 LBT is performed again before a next TTI.

This embodiment provides an example method for implementing the LBT mechanism in Embodiment 1 at a high unlicensed frequency band, to implement a directional LBT function at the high unlicensed frequency band, thereby ensuring directional signal transmission of a system, improving system operating efficiency, and improving a system capacity.

Embodiment 3

A first network element performs random backoff LBT for channel preemption, and after the preemption succeeds, the first network element notifies, in at least one TTI within a maximum channel occupancy time MCOT, a second network element of frame structure information of a corresponding TTI, so that the second network element performs directional signal transmission in the corresponding TTI.

For example, a plurality of consecutive TTIs may be scheduled in a same beam direction for data transmission. A network device may perform data transmission with a same terminal device in the same beam direction in the plurality of consecutive TTIs, or may perform data transmission with different terminal devices in the same beam direction in the plurality of consecutive TTIs. Different from Embodiment 1 and Embodiment 2, a Cat-2 LBT operation may not need to be performed between the plurality of TTIs that are scheduled in the same direction for data transmission.

Figure 4:
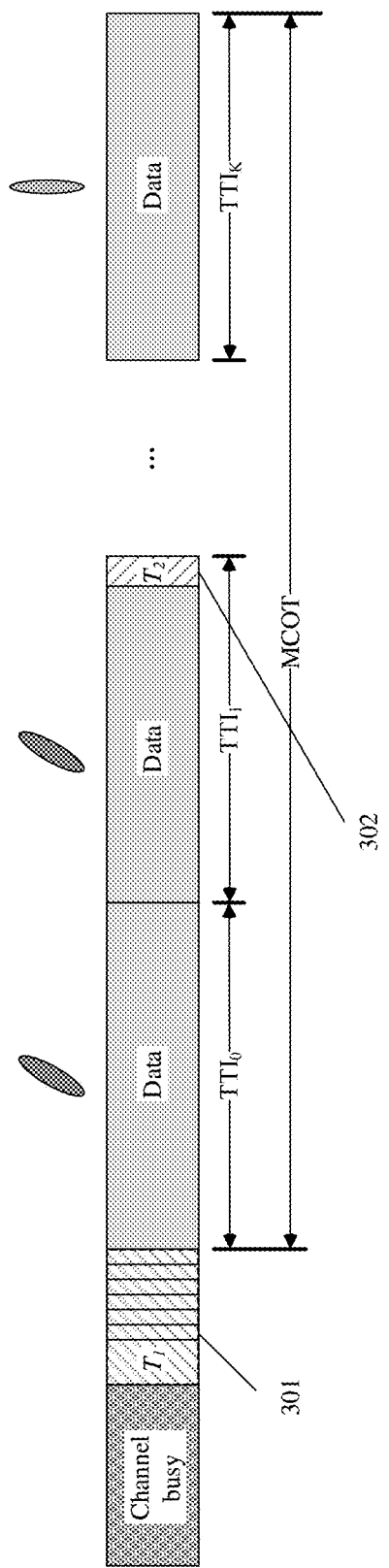
FIG. 4 is a schematic diagram of a frame structure of a channel access method according to still another embodiment of this application.

In FIG. 4, signal transmission between a network device and a terminal device is used as an example, and the method includes the following steps.

301. The first network element performs Cat-4 LBT for channel preemption, and notifies, in the at least one TTI within the MCOT after the preemption succeeds, the second network element of the frame structure information of the corresponding TTI.

An example in which the first network element is a network device and the second network element is a terminal device is used for description below.

The network device performs the Cat-4 LBT for channel preemption. This is the same as step 201, and details are not described herein again.

After the preemption succeeds, the network device may notify the terminal device of the frame structure information of the TTI in which signal transmission can be performed. For example, the network device notifies the terminal device whether each frame for signal transmission includes an LBT gap; or only notifies the terminal device that the last frame for signal transmission includes an LBT gap, where in this case, none of previous frames includes an LBT gap by default, and therefore continuous transmission may be performed; or notifies the terminal device of a quantity or a length of TTIs available for continuous transmission. During the notification, the network device may send the foregoing information in the first frame of consecutive TTIs, for example, a $TTI_0$ in FIG. 4. The network device may alternatively notify, in each frame, the terminal device whether each frame includes an LBT gap. Then the network device may perform directional signal transmission with the terminal device in the corresponding TTI. If the corresponding TTI is a plurality of consecutive TTIs (no LBT gap is included in between), continuous directional signal transmission is performed.

For example, in FIG. 4, after successfully performing the Cat-4 LBT for channel preemption, if the network device needs to perform continuous signal transmission in a $TTI_0$ and a $TTI_1$, that is, the $TTI_0$ and the $TTI_1$ are consecutive and no LBT gap is included in between, the network device notifies the terminal device of a frame structure of the $TTI_0$ and a frame structure of the $TTI_1$, that is, whether an LBT gap is included. The network device may notify the terminal device that the $TTI_0$ does not include an LBT gap and that the $TTI_1$ includes an LBT gap, or only notifies the terminal device that the $TTI_1$ includes an LBT gap, where in this case, the previous $TTI_0$ does not include an LBT gap by default. Alternatively, the network device notifies the terminal device of a quantity or a length of the two TTIs available for continuous transmission. The network device may send the foregoing notification information in the $TTI_0$. In addition, the network may alternatively indicate in the $TTI_0$ that the $TTI_0$ does not include an LBT gap, and indicate in the $TTI_1$ that the $TTI_1$ includes an LBT gap. Then the network device may perform continuous signal transmission with the terminal device in the $TTI_0$ and the $TTI_1$. A Cat-2 LBT operation does not need to be performed between the $TTI_0$ and the $TTI_1$. There may be one or more terminal devices.

In the foregoing example, after successfully performing the Cat-4 LBT for channel preemption, the network device notifies the terminal device of a frame structure of several consecutive TTIs in the first TTI within the MCOT. The network device may alternatively notify the terminal device of a frame structure of several consecutive TTIs in any TTI within the MCOT. For example, after transmission in the $TTI_1$ is completed, the network device performs Cat-2 LBT. If channel preemption succeeds, the network device notifies the terminal device of the frame structure of several consecutive TTIs, for example, a $TTI_2$ and a $TTI_3$, so that the terminal device performs continuous signal transmission in the $TTI_2$ and the $TTI_3$. Alternatively, after successfully performing the Cat-4 LBT for channel preemption, and completing signal transmission in the $TTI_0$, the network device performs Cat-2 LBT. If channel preemption succeeds, the network device notifies the terminal device of the frame structure of several consecutive TTIs, for example, the $TTI_1$ and a $TTI_2$, so that the terminal device performs continuous signal transmission in the $TTI_1$ and the $TTI_2$.

For example, the network device may notify one or more scheduled terminal devices that are in a beam direction on a common PDCCH, and the network device may use one or more bits in common downlink control information DCI (for example, DCI 1C) to indicate frame structure information of a current TTI or frame structure information of subsequent TTIs for continuous transmission. The scheduled terminal device performs signal transmission based on the indication information and a specified frame structure.

The network device may alternatively notify the scheduled terminal device through a UE-specific PDCCH, and the network device may use one or more bits in UE-specific downlink control information (DCI) to indicate frame structure information of a current TTI or frame structure information of subsequent TTIs for continuous transmission. The scheduled terminal device performs signal transmission based on the indication information and a specified frame structure.

The directional signal transmission may be to send a signal or receive a signal. For example, the network device sends a signal to the terminal device by using a transmit beam, or the network device receives a signal from the terminal device by using a receive beam, or the terminal device sends a signal to the network device by using a transmit beam, or the terminal device receives a signal from the network device by using a receive beam. The signal may be at least one of data or signaling.

302. The first network element performs directional Cat-2 LBT before another at least one TTI within the MCOT.

Before a TTI within the MCOT, the Cat-2 LBT may alternatively be performed, and then directional signal transmission is performed, as described in step 202. Details are not described herein again.

Nonrandom backoff LBT may be performed before consecutive TTIs, or may be performed after consecutive TTIs.

For example, in FIG. 4, after completing signal transmission in the $TTI_0$, and the $TTI_1$, the network device performs the Cat-2 LBT at $T_2$ before the $TTI_2$. If the channel preemption succeeds, the network device performs directional signal transmission in the $TTI_2$.

In another example, if the $TTI_0$, includes an LBT gap, and the $TTI_1$ and the $TTI_2$ are consecutive and no LBT gap is included in between, after successfully performing the Cat-4 LBT for channel preemption, and completing signal transmission in the $TTI_0$, the network device performs the Cat-2 LBT. If channel preemption succeeds, the network device notifies the terminal device of a frame structure of several consecutive TTIs, for example, notifying the terminal device that only the $TTI_2$ includes an LBT gap, so that the terminal device performs continuous signal transmission in the $TTI_0$ and the $TTI_2$.

After one MCOT ends, the network device needs to re-perform the Cat-4 LBT for channel preemption.

Alternatively, in the foregoing embodiment, the first network element may be a terminal device, and the second network element may be a network device.

This embodiment provides a specific method for implementing an LBT mechanism at a high unlicensed frequency band, to effectively implement a directional LBT function, thereby ensuring directional signal transmission of a system, improving system operating efficiency, and improving a system capacity.

Figure 5:
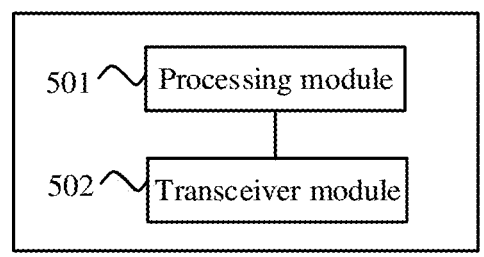
FIG. 5 is a schematic diagram of a channel access apparatus according to an embodiment of this application.

Based on the network elements in Method Embodiment 1 and Method Embodiment 2, a channel access apparatus is further disclosed. Referring to FIG. 5, the apparatus includes: a processing module 501, configured to perform random backoff LBT for channel preemption; and a transceiver module 502, configured to perform, after the channel preemption succeeds, signal transmission in the first TTI within a maximum channel occupancy time MCOT.

The processing module 501 is further configured to perform, before another at least one TTI within the maximum channel occupancy time MCOT, nonrandom backoff LBT for channel preemption.

The transceiver module 502 may include a sending module and a receiving module that perform the transmit operation and the receive operation in the method embodiments, respectively.

In another example, the processing module may be replaced by a processor, and the transceiver module may be replaced by a transceiver. The transceiver may include a transmitter and a receiver that perform the transmit operation and the receive operation in the method embodiments, respectively.

The foregoing channel access apparatus completely corresponds to the network elements in Method Embodiment 1 and Method Embodiment 2. A corresponding module performs a corresponding step. For example, the transceiver module performs the step of signal transmission in the method embodiments, and other steps such as the LBT operations are implemented by the processing module. The foregoing content lists only some functions, and for other functions, refer to corresponding steps in Embodiment 2 and the descriptions in Summary.

Based on the first network element in Method Embodiment 3, a channel access apparatus is further disclosed. Referring to FIG. 5, the apparatus includes: a processing module 501, configured to perform random backoff LBT for channel preemption; and a transceiver module 502, configured to notify, in at least one TTI within a maximum channel occupancy time MCOT after the preemption succeeds, a network element of frame structure information of a corresponding TTI, so that the network element performs directional signal transmission in the corresponding TTI, where the network element corresponds to the second network element in Embodiment 3.

In another example, the processing module may be replaced by a processor, and the transceiver module may be replaced by a transceiver.

The processing module 501 is further configured to perform, before another at least one TTI within the MCOT, nonrandom backoff LBT for channel preemption.

The transceiver module 502 may include a sending module and a receiving module that perform the transmit operation and the receive operation in the method embodiments, respectively.

In another example, the processing module may be replaced by a processor, and the transceiver module may be replaced by a transceiver. The transceiver may include a transmitter and a receiver that perform the transmit operation and the receive operation in the method embodiments, respectively.

The foregoing channel access apparatus corresponds to the first network element in Method Embodiment 3. A corresponding module performs a corresponding step. For example, the transceiver module performs the step of signal transmission in the method embodiments, and other steps such as the LBT operations are implemented by the processing module. The foregoing content lists only some functions, and for other functions, refer to corresponding steps in Embodiment 3 and the descriptions in Summary.

Figure 6:
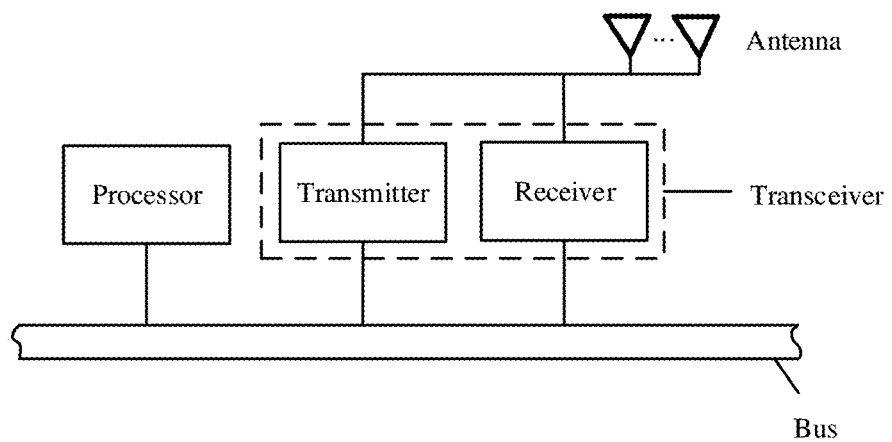
FIG. 6 is a schematic diagram of a channel access apparatus according to another embodiment of this application.

For an example structure of another apparatus, refer to FIG. 6. A processor may be a general-purpose processor, a digital signal processor, an application-specific integrated circuit, a field-programmable gate array, or another programmable logic component.

A transceiver may include a transmitter and a receiver. An antenna may be further included, and there may be one or more antennas.

The foregoing components may be coupled together by a bus. The bus not only includes a data bus, but also includes a power bus, a control bus, and a status signal bus. However, for clarity of description, various buses are denoted as the bus in the figure.

FIG. 6 is only a schematic diagram. Another element may be further included, or only some components may be included. For example, the transmitter and the receiver are included, or only the transmitter, the receiver, and the processor are included.

Further, in a specific embodiment, a memory (not shown in the figure) may be further included to store computer executable program code. When the program code includes an instruction, and when the processor executes the instruction, the instruction enables a network device or a terminal device to perform a corresponding step in the method embodiments.

In the methods and apparatuses in the foregoing embodiments of this application, the terminal device may flexibly feed back beam information, so that the base station implements flexible scheduling, thereby saving resources.

In the specification, claims, and accompanying drawings of this application, the terms "first", "second", "third", "fourth", and so on are intended to distinguish between different objects but do not indicate a particular order. In addition, the terms "including", "containing", and any other variants thereof are intended to cover non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the system, the product, or the device.

All or some of the foregoing embodiments may be implemented by software, hardware, firmware, or any combination thereof. When implemented by software, all or some of the embodiments may be implemented in a form of a computer program product. The computer program product includes one or more computer instructions. When the computer program instructions are loaded and executed on a computer, all or some of the procedures or functions in the embodiments of this application are generated. The computer may be a general-purpose computer, a dedicated computer, a computer network, or other programmable apparatuses. The computer instructions may be stored in a computer readable storage medium or transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

What are disclosed above are merely example embodiments of this application, and certainly are not intended to limit the protection scope of this application. Therefore, equivalent variations made in accordance with the claims of this application shall fall within the scope of this application

The invention claimed is:

1. A method, comprising:
performing, by a network element, a random backoff listen before talk (LBT) to determine whether a channel is available;
after determining the channel is available, performing, a signal transmission in a first transmission time interval within a maximum channel occupancy time (MCOT); and
performing, by the network element before another at least one transmission time interval within the MCOT, a non-random backoff LBT to determine whether the channel is available.

2. The method according to claim 1, wherein the random backoff LBT comprises an omnidirectional random backoff LBT or a directional random backoff LBT, and the signal transmission in the first transmission time interval comprises a directional signal transmission.

3. The method according to claim 1, wherein the non-random backoff LBT comprises a directional non-random backoff LBT, and a signal transmission in a transmission time interval after the directional non-random backoff LBT comprises a directional signal transmission.

4. The method according to claim 3, wherein a receive beam direction of the directional non-random backoff LBT covers a transmit beam direction of the signal transmission performed in the transmission time interval after the directional non-random backoff LBT.

5. The method according to claim$_3$, wherein a receive beam of the directional non-random backoff LBT and a transmit beam of the signal transmission performed in the transmission time interval after the directional non-random backoff LBT are directed in manners that the receive beam of the directional non-random backoff LBT covers the transmit beam of the signal transmission performed in the transmission time interval after the directional non-random backoff LBT.

6. The method according to claim 3, wherein a receive beam direction of the directional non-random backoff LBT is the same as a transmit beam direction of the signal transmission performed in the transmission time interval after the directional non-random backoff LBT.

7. A method, comprising:
performing, by a first network element, a random backoff listen before talk (LBT) to determine whether a channel is available; and
in response to determining that the channel is available, notifying, by the first network element in at least one transmission time interval within a maximum channel occupancy time (MCOT), a second network element of frame structure information of a set of corresponding transmission time intervals to enable the second network element to perform a directional signal transmission in the set of corresponding transmission time intervals.

8. The method according to claim 7, wherein the frame structure information of the set of corresponding transmission time intervals comprises information indicating whether the set of corresponding transmission time intervals comprises an LBT gap.

9. The method according to claim 7, wherein the set of corresponding transmission time intervals comprises a plurality of consecutive transmission time intervals, and the frame structure information of the set of corresponding transmission time intervals comprises information indicating at least one of the following:
a last transmission time interval within the MCOT comprises an LBT gap, and other transmission time intervals within the MCOT do not comprise an LBT gap;
only the last transmission time interval within the MCOT comprises an LBT gap; or
information about a quantity or a length of the plurality of consecutive transmission time intervals.

10. The method according to claim 7, further comprising:
performing, by the first network element before another at least one transmission time interval within the MCOT, a non-random backoff LBT to determine whether the channel is available.

11. An apparatus, comprising:
a processor, configured to perform a random backoff listen before talk (LBT) to determine whether a channel is available; and
a transceiver, configured to perform, after determining that the channel is available, a signal transmission in a first transmission time interval within a maximum channel occupancy time (MCOT); and
wherein the processor is further configured to perform, before another at least one transmission time interval within the MCOT, a non-random backoff LBT to determine whether the channel is available.

12. The apparatus according to claim 11, wherein the random backoff LBT comprises an omnidirectional random backoff LBT or a directional random backoff LBT, and the signal transmission in the first transmission time interval comprises a directional signal transmission.

13. The apparatus according to claim 11, wherein the non-random backoff LBT comprises a directional non-random backoff LBT, and a signal transmission in a transmission time interval after the directional non-random backoff LBT comprises a directional signal transmission.

14. The apparatus according to claim 13, wherein a receive beam direction of the directional non-random backoff LBT covers a transmit beam direction of the signal transmission performed in the transmission time interval after the directional non-random backoff LBT.

15. The apparatus according to claim 13, wherein a receive beam of the directional non-random backoff LBT and a transmit beam of the signal transmission performed in the transmission time interval after the directional non-random backoff LBT are directed in manners that the receive beam of the directional non-random backoff LBT covers the transmit beam of the signal transmission performed in the transmission time interval after the directional non-random backoff LBT.

16. The apparatus according to claim 13, wherein a receive beam direction of the directional non-random backoff LBT is the same as a transmit beam direction of the signal transmission performed in the transmission time interval after the directional non-random backoff LBT.

17. An apparatus, comprising:
a processor, configured to perform a random backoff listen before talk (LBT) to determine whether a channel is available; and a transceiver, configured to notify, in at least one transmission time interval within a maximum channel occupancy time (MCOT) after determining that the channel is available, a network element of frame structure information of a set of corresponding transmission time intervals to enable the network element to perform a directional signal transmission in the set of corresponding transmission time intervals.

18. The apparatus according to claim 17, wherein the frame structure information of the set of corresponding transmission time intervals comprises information indicating whether the set of corresponding transmission time intervals comprises an LBT gap.

19. The apparatus according to claim 17, wherein the set of corresponding transmission time intervals comprises a plurality of consecutive transmission time intervals, and the frame structure information of the set of corresponding transmission time intervals comprises information indicating at least one of the following:
- a last transmission time interval within the MCOT comprises an LBT gap, and other transmission time intervals within the MCOT do not comprise an LBT gap;
- only the last transmission time interval within the MCOT comprises an LBT gap; or
- information about a quantity or a length of the plurality of consecutive transmission time intervals.

20. The apparatus according to claim 17, wherein the processor is further configured to: perform a non-random backoff LBT to determine whether the channel is available before another at least one transmission time interval within the MCOT.

* * * * *

UNITED STATES PATENT AND TRADEMARK OFFICE
CERTIFICATE OF CORRECTION

PATENT NO. : 11,706,799 B2  
APPLICATION NO. : 17/336477  
DATED : July 18, 2023  
INVENTOR(S) : Huang et al.

Page 1 of 1

It is certified that error appears in the above-identified patent and that said Letters Patent is hereby corrected as shown below:

In the Specification

In Column 4, Line 49, delete "Tn." and insert -- TTI. --.

In Column 12, Line 40, delete "$TTI_0$," and insert -- $TTI_0$ --.

In Column 12, Line 44, delete "$TTI_0$," and insert -- $TTI_0$ --.

In Column 12, Line 53, delete "$TTI_0$" and insert -- $TTI_1$ --.

In the Claims

In Column 15, in Claim 5, Line 39, delete "$claim_3$," and insert -- claim 3, --.

Signed and Sealed this  
Tenth Day of October, 2023

Katherine Kelly Vidal  
*Director of the United States Patent and Trademark Office*